(12) United States Patent
Troxel

(10) Patent No.: US 8,063,816 B2
(45) Date of Patent: Nov. 22, 2011

(54) METHOD AND APPARATUS TO IMPROVE THE ABILITY TO DECODE ADS-B SQUITTERS THROUGH MULTIPLE PROCESSING PATHS

(75) Inventor: James Roy Troxel, Glendale, AZ (US)

(73) Assignee: Aviation Communication&Surveillance Systems LLC, Phoenix, AZ (US)

( * ) Notice: Subject to any disclaimer, the term of this patent is extended or adjusted under 35 U.S.C. 154(b) by 0 days.

(21) Appl. No.: 12/646,664

(22) Filed: Dec. 23, 2009

(65) Prior Publication Data

US 2011/0001653 A1 Jan. 6, 2011

Related U.S. Application Data

(63) Continuation of application No. 12/033,850, filed on Feb. 19, 2008, now abandoned.

(60) Provisional application No. 60/901,819, filed on Feb. 16, 2007.

(51) Int. Cl.
*G01S 13/00* (2006.01)
*G01S 13/74* (2006.01)

(52) U.S. Cl. ............... 342/30; 342/29; 342/33; 342/36; 342/42

(58) Field of Classification Search ............. 342/29–40, 342/42; 340/961
See application file for complete search history.

(56) References Cited

U.S. PATENT DOCUMENTS

| | | | | |
|---|---|---|---|---|
| 4,945,550 A | * | 7/1990 | Krause et al. | 375/340 |
| 4,980,897 A | * | 12/1990 | Decker et al. | 375/265 |
| 5,089,822 A | * | 2/1992 | Abaunza et al. | 342/30 |
| 5,452,472 A | * | 9/1995 | Tanaka | 340/7.33 |
| 5,712,628 A | * | 1/1998 | Phillips et al. | 340/10.51 |
| 5,784,392 A | * | 7/1998 | Czaja et al. | 714/786 |
| 6,169,770 B1 | * | 1/2001 | Henely | 375/317 |
| 6,563,453 B1 | * | 5/2003 | Wilson | 342/29 |
| 6,567,043 B2 | * | 5/2003 | Smith et al. | 342/450 |
| 6,744,396 B2 | * | 6/2004 | Stone et al. | 342/36 |

(Continued)

FOREIGN PATENT DOCUMENTS

WO WO 0205454 1/2002

(Continued)

OTHER PUBLICATIONS

Application of multiple path sequential decoding for intersymbol interference reduction problem, Haccoun, D. Kallel, S. Department of Electrical and Computer Engineering, Ecole Polytech. de Montreal, ue., Canada; Communications, Speech and Vision, IEE Proceedings I, Feb. 1991, vol. 138, Issue: 1, pp. 21-31.*

(Continued)

*Primary Examiner* — Thomas Tarcza
*Assistant Examiner* — Peter Bythrow
(74) *Attorney, Agent, or Firm* — Allen J. Moss; Squire, Sanders & Demspey L.L.P.

(57) ABSTRACT

A system is delineated comprising a TCAS receiver having one or more filters, one or more amplifiers and one or more A/D converters, the one or more A/D converters for digitizing analog data into digital data for decoding one or more of an ADS-B message and a TIS-B message; and circuitry for receiving the digital data and decoding the one or more of an ADS-B message and a TIS-B message, wherein the circuitry includes two or more paths for the decoding.

13 Claims, 3 Drawing Sheets

U.S. PATENT DOCUMENTS

| | | | |
|---|---|---|---|
| 7,006,032 B2* | 2/2006 | King et al. | 342/29 |
| 7,138,930 B1* | 11/2006 | Paul et al. | 341/59 |
| 7,148,816 B1* | 12/2006 | Carrico | 340/961 |
| 7,307,579 B2* | 12/2007 | Rees et al. | 342/29 |
| 7,352,318 B2* | 4/2008 | Osman et al. | 342/37 |
| 7,423,590 B2* | 9/2008 | Smith | 342/450 |
| 7,443,334 B2* | 10/2008 | Rees et al. | 342/29 |
| 7,495,612 B2* | 2/2009 | Smith | 342/450 |
| 2004/0032367 A1* | 2/2004 | Smith et al. | 342/456 |
| 2004/0102172 A1* | 5/2004 | Hendin | 455/302 |

FOREIGN PATENT DOCUMENTS

| | | |
|---|---|---|
| WO | WO 2005111654 | 11/2005 |

OTHER PUBLICATIONS

TCAS I Guidelines, Orlando et al. Sep. 24, 1982, Lincoln Laboratory, Massachusetts Institute of Technology, Project Report ATC-114.*

James, Ron. "Proposed Appendix M (draft version 5) to the 1090MHz ADS-B MOPS to define Extended Range Reception Techniques", RTCA Special Committee 186, Working Group 3, ADS-B 1090 MOPS Revision A, Meeting #10; Mar. 26, 2002.*

Harman, William. "Preamble Detection, Lincoln Laboratory Design", RTCA Special Committee 186, Working Group #3, ADS-B 1090 MOPS Revision A, Meeting #12; Jul. 9, 2002.*

Hwang, Jeng-Kuang et al., "FPGA Implementation of an All-Digital T/2-Spaced QPSK Receiver with Farrow Interpolation Timing Synchronizer and Recursive Costas Loop," 2004 IEEE Asia-Pacific Conference on Advanced System Integrated Circuits, Aug. 4-5, 2004, pp. 248-251.

Song, Myong-Lyol, "The Architecture of High-Speed Matched Filter for Searching Synchronization in DSSS Receiver," Information & Telecommunication Engineering, Hoseo University, 2002, pp. 878-881.

* cited by examiner

METHOD AND APPARATUS TO IMPROVE THE ABILITY TO DECODE ADS-B SQUITTERS THROUGH MULTIPLE PROCESSING PATHS

CROSS REFERENCE TO RELATED APPLICATIONS

This application is a continuation of and claims priority to U.S. patent application Ser. No. 12/033,850, filed Feb. 19, 2008 now abandoned and entitled "Method and Apparatus to Improve the Ability to Decode ADS-B Squitters Through Multiple Processing Paths" which claims priority from U.S. Provisional Application No. 60/901,819, filed on Feb. 16, 2007 in the name of James R. Troxel and entitled "Method and Apparatus to Improve the Ability to Decode ADS-B Squitters Through Multiple Processing Paths" and is also related to U.S. application Ser. No. 11/784,235, filed on Apr. 6, 2007 in the name of Gregory H. Piesinger and entitled "Method and Apparatus to Increase ADS-B Squitter Reception Sensitivity," the disclosures of which are incorporated by reference.

BACKGROUND OF THE INVENTION

1. Field of the Invention

The present invention pertains to TCAS and, more particularly, to a TCAS system for decoding ADS-B and/or TIS-B messages with improved receiver sensitivity.

2. Background

ADS-B: The Automatic Dependent Surveillance-Broadcast (ADS-B) is an avionics protocol that allows an ADS-B equipped system, such as an ADS-B equipped aircraft, to "see" on a display other ADS-B equipped systems in range of the subject system. An ADS-B equipped system may comprise an aircraft, a ground-based vehicle, such as a service vehicle at an airport, or anything else that one would want to "see" using ADS-B. Air traffic control may also use ADS-B to "see" ADS-B equipped systems.

Under the ADS-B protocol, an ADS-B equipped system periodically broadcasts its own state vector and other information without knowing which, if any, other ADS-B equipped systems might be receiving it, and without expectation of an acknowledgement or reply. ADS-B is "automatic" in the sense that no pilot or controller action is required for the information to be issued. ADS-B is "dependent surveillance" in the sense that the surveillance-type information so obtained depends on the suitable navigation and broadcast capability of the ADS-B equipped system making the transmission.

In operation, an aircraft or other ADS-B equipped system determines position information about itself, typically employing the global positioning system (GPS). The position information is employed to create a digital code, which may be combined with other information such as aircraft type, aircraft speed, aircraft flight number and whether the aircraft is turning, climbing or descending. The digital code, which may contain all of this information or in some cases more or less information, is updated several times a second and broadcast from the ADS-B-equipped system on a discrete frequency, called a data link. To transmit and receive ADS-B, an ADS-B equipped system may employ a Mode-S Extended Squitter (1090 ES) transponder, a Universal Access Transceiver (UAT), both a Mode-S Extended Squitter (1090 ES) transponder and a Universal Access Transceiver (UAT), or any equivalents thereof. ADS-B equipped systems, such as an aircraft or a ground station, within about 150 miles of an ADS-B transmission source may receive the ADS-B and display the received information. For example, a pilot in an aircraft cockpit can see traffic on a Cockpit Display of Traffic Information (CDTI). Additionally, air traffic controllers on the ground can see ADS-B traffic on their traffic display screen, as well as other radar targets.

RTCA: The Radio Technical Commission for Aeronautics or RTCA, Inc. is a private, not-for-profit corporation that develops consensus-based recommendations regarding communications, navigation, surveillance, and air traffic management (CNS/ATM) system issues. Its recommendations are used by the Federal Aviation Administration (FAA) as the basis for policy, program, and regulatory decisions and by the private sector as the basis for development, investment and other business decisions. RTCA publication DO-260A is entitled Minimum Operational Performance Standards for 1090 MHz Extended Squitter Automatic Dependent Surveillance-Broadcast (ADS-B) and Traffic Information Services-Broadcast (TIS-B). Appendix I of RTCA publication DO-260A (Appendix I) describes methods used to detect and correct data errors in ADS-B or TIS-B squitter messages.

TIS-B: TIS-B supplements ADS-B air-to-air services to provide complete situational awareness in the cockpit of all traffic known to the Air Traffic Control (ATC) system. TIS-B is a useful service for an ADS-B link in airspace where not all aircraft are transmitting ADS-B information. The ground ADS-B station transmits surveillance target information on the ADS-B data link for unequipped aircraft or aircraft transmitting only on another ADS-B link. TIS-B uplinks are derived from the best available ground surveillance sources, which may include ground radars for primary and secondary targets, multi-lateration systems for targets on the airport surface and/or ADS-B systems for targets equipped with a different ADS-B link.

ADS-B AND TIS-B MESSAGES: ADS-B and TIS-B messages are transmitted at 1090 MHz and consist of a data field of 112 bits that uses pulse position modulation (PPM) and is preceded by a four pulse preamble. The first 5 bits of the data field is the downlink field (DF). An ADS-B message has a DF field equal to 17 decimal (10001 binary) and a TIS-B message has a DF field equal to 18 decimal (10010 binary).

ERRONEOUS ADS-B AND TIS-B MESSAGES: Data error in an ADS-B or TIS-B message can be due to receiver noise for low level signals that are close to the receiver noise floor or due to overlapping signals that are generated by other transponder replies or from TIS-B ground stations, or other on-channel transmitters such as DME systems tuned to 1090 MHz. These overlapping signals (with the exception of DME systems) are termed "fruit signals" and can either be Air Traffic Control Radar Beacon System (ATCRBS) format of 15 bits or Mode S format of either 56 or 112 bits. Within the data field of 112 bits for an ADS-B or TIS-B message is a subfield of 24 bits that is used for parity encoding and is called the Parity/Identity field (PI field). The 24 bit PI field is generated by a polynomial division of the Mode S message by a fixed 24 bit polynomial. The PI field is used for detecting bit errors and may also be used for correcting bit errors in the message. Using error correction techniques set forth in Appendix I, it is possible to correct some messages which have erroneous bits due to receiver noise or fruit signals. In some cases, the messages can be corrected even if the overlapping fruit signals are much stronger than the ADS-B or TIS-B signal.

The error detection and correction methods set forth in Appendix I rely on the ability to correct bits that have obvious errors and mark other bits that may have less obvious errors as "low confidence" bits. After bits are either corrected or marked as "low confidence," several well known algorithms can be used to correct the messages. These algorithms rely on the use of the PI field and the polynomial division operation to determine if the message has been corrected. These correction methods are set forth in Appendix I and include the "conservative technique," the "brute-force technique" and the "whole message technique." Using these algorithms, the undetected error rate is sufficiently small to meet system safety requirements.

In order to correct obvious bit errors and mark questionable bits as "low confidence," the error correction algorithms set forth in Appendix I first determine the average RF level of the first 4 pulses in the message (these first 4 pulses are referred to as the "preamble"). The error correction algorithms set forth in Appendix I take a number of samples from the top of each of the 4 preamble pulses at a sample rate of 8 or 10 MHz and perform a number of tests and operations on the samples. Since it is possible to have overlapping higher amplitude fruit signals in the preamble, the algorithms attempt to remove these samples since they would provide an undesirable bias measurement of the RF level. This operation forms what is referred to in Appendix I as a "preamble reference level," which is used for decoding the data in the ADS-B message.

Once the preamble reference level is determined, each of the data bits in the ADS-B message are processed using this level to determine the bit value (1 or 0) and whether it is a high or low confidence bit. Several error correction methods are described in the Appendix I, which are termed "multi-sample" due to the fact that each bit (1 micro-second in duration) has a number of samples which are processed (8 for an 8 MHz clock). The multi-sample error correction methods described in Appendix I include the "baseline multi-sample" and the "table look-up multi-sample." Each of these methods rely on the determination of the preamble reference level. Other methods for data detection are possible, and other sample rates which are not defined in Appendix I may be used. Each of these methods assigns a bit value to each bit (1 or 0) and a confidence level for each bit (high or low). According to Appendix I, where obvious bit errors are detectable, the bit value is corrected by one of the multi-sample techniques, and the bit is labeled "high confidence." This bit correction occurs prior to the error detection and correction algorithms described below.

After the message data bit value and confidence has been determined for the 112 bit message by one of the multi-sample techniques, an error syndrome, which is described in DO-260A and DO-185A (both of which are RTCA publications incorporated herein by reference), will be computed to determine if errors exist in the message. The error syndrome uses the PI field and a polynomial division operation in order to make the determination. If the error syndrome is non-zero, then several methods can be used to attempt to correct the message. The methods described in Appendix I are the "conservative technique," the "brute-force technique," and the "whole message technique." Each of these methods makes use of the bit confidence level in order to attempt the correction.

The "conservative technique" can correct messages that have 12 or less low confidence bits that span no more than 24 Mode S bits and have no more than 7 consecutive low confidence bits. If this criteria is not met, then the "conservative technique" cannot be used to correct the message, since it may result in an unacceptable undetected error rate.

The "brute force technique" can correct messages that have 5 or less low confidence bits, regardless of where they occur in the message. If more than 5 low confidence bits exist, the message cannot be corrected using "brute force technique" due to the possibility of an unacceptable undetected error rate.

The "whole message technique" also uses low confidence bits and has similar limitations.

In the case of the error correction methods described in Appendix I (the "conservative technique," the "brute-force technique" and the "whole message technique"), if too many low confidence bits exist or if bits that have errors are not marked as low confidence, the message cannot be corrected. The preamble reference level has a major effect on this determination. Some of the errors in the preamble reference level determination include errors due to noise for low level signals or errors due to overlapping fruit (interference) that corrupt the preamble reference level determination. If the preamble reference level determination is off, then the following undesirable situations may occur:

Bits that should be marked as low confidence bits may be marked as high confidence bits. If the bits have the wrong bit value, the error correction techniques cannot correct the message. The techniques will not attempt to correct bits that are marked as high confidence bits.

Bits that should be marked as high confidence bits may be marked as low confidence bits. If too many low confidence bits exist, the message will not be corrected.

Another problem can occur when the timing of the preamble is not determined correctly (start of the Mode S data). The first bit of the Mode S data is 8 micro-seconds from the first preamble pulse. If the preamble pulse timing is not determined correctly, the data decoding may not be correct. The preamble timing determination may be in error due to noise for low level signals or errors due to overlapping fruit (interference). Some of the same issues will exist in the bit value and bit confidence determination, as described above.

Another problem may occur due to limitations of the decoding algorithms, namely, the enhanced preamble detection algorithms specified in section 4.1 of Appendix I or the enhanced bit and confidence declaration in section 4.2 of Appendix I. These algorithms, as set forth Appendix I, work well when the signal to noise ratio of the ADS-B/TIS-B signal is fairly good, e.g., when the signal level exceeds the noise level by at least 6 dB. The algorithms assume that if higher sensitivity is required, such as is the case for having A3 receiver sensitivity (as used herein "A3 receiver sensitivity" means Class A3 receiver sensitivity, as set forth in DO-260A), an active antenna will be used to improve the signal to noise ratio for the ADS-B receiver. However, when the ADS-B or TIS-B signals have a poor signal to noise ratio, such as when a non-active or passive antenna is used as part of a TCAS system, the Appendix I algorithms do not provide adequate performance.

Thus, a need exists for improved systems and methods for decoding ADS-B and TIS-B messages to achieve at least A3 receiver sensitivity while employing a passive antenna to receive the messages.

SUMMARY OF THE INVENTION

In accordance with one embodiment of the invention, a system is disclosed comprising a TCAS receiver with at least A3 receiver sensitivity for receiving and decoding one or more of an ADS-B message and a TIS-B message, said at least A3 receiver sensitivity achieved without an active antenna; and a passive antenna coupled to the TCAS receiver.

In accordance with another embodiment of the invention, a system is disclosed comprising a TCAS receiver having one or more filters, one or more amplifiers and one or more A/D converters, the one or more A/D converters for digitizing analog data into digital data for decoding one or more of an ADS-B message and a TIS-B message; and circuitry for receiving the digital data and decoding the one or more of an ADS-B message and a TIS-B message, wherein the circuitry includes two or more paths for the decoding.

In accordance with another embodiment of the invention, a method is disclosed comprising providing a TCAS receiver having one or more filters, one or more amplifiers and one or more A/D converters, the one or more A/D converters for digitizing analog data into digital data for decoding one or more of an ADS-B message and a TIS-B message; and receiving the digital data and decoding the one or more of an ADS-B message and a TIS-B message with circuitry including two or more paths for the decoding.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawings.

Embodiments of the present invention process receiver data through multiple dissimilar paths in order to provide optimal ADS-B decoding performance. Statements herein, such as the foregoing statement, referring to processing solely ADS-B messages may apply to processing solely TIS-B messages or processing both ADS-B and TIS-B messages. Similarly, statements herein referring to processing solely TIS-B messages may apply to processing solely ADS-B messages or processing both ADS-B and TIS-B messages.

To employ multiple dissimilar paths, embodiments of the present invention may use the same algorithm on multiple data processing paths while modifying one or more parameters of the algorithm, or process the receiver data through paths that implement different algorithms. The multiple dissimilar algorithms which may produce the same or different results rely on the use of the parity encoding which is part of the ADS-B and/or TIS-B message to determine which path or paths are correct. Again, it is understood that multiple dissimilar algorithms may be established by using the same algorithm on multiple data processing paths while modifying one or more parameters of the algorithm, or processing the receiver data through paths that implement different algorithms.

Figure 1:
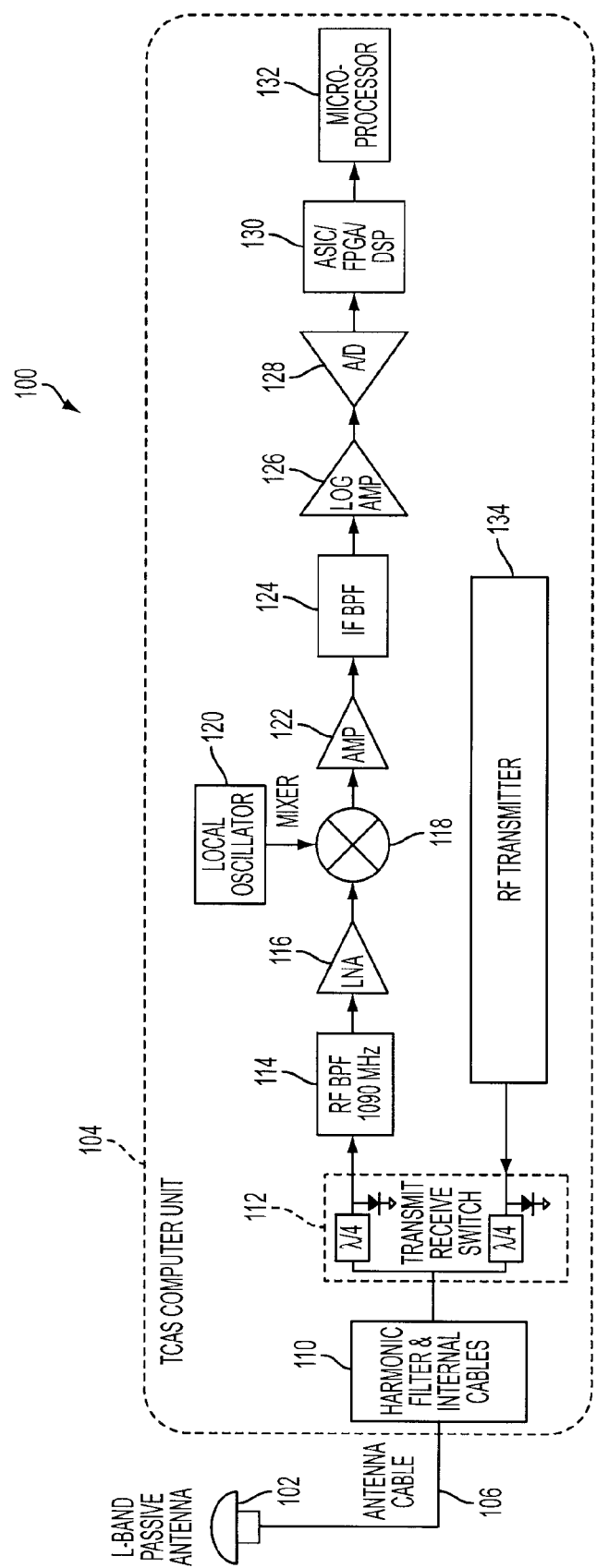
FIG. 1 is block diagram of a TCAS, in accordance with systems and methods consistent with the present invention.

Referring to FIG. 1, a block diagram is shown of a Traffic alert and Collision Avoidance System (TCAS) 100 employing systems and methods consistent with the present invention. TCAS 100 includes a passive L-Band antenna 102, which may be either directional or omni-directional. Antenna 102 is connected to a TCAS computer unit 104 through one or more RF cables 106 with a loss of up to 3 dB. The one or more RF cables 106 connect to a low pass filter 110 that reduces the harmonic content of transmissions. The low pass filter 110 is connected to a transmit/receive switch 112 that allows the antenna 102 to be connected to either a TCAS transmitter 134 or a TCAS receiver 114-128.

When TCAS 100 is in the receive mode, the receiver 114-128 processes ATCRBS or Mode S replies to TCAS interrogations and also squitters which are used for TCAS and ADS-B or TIS-B functions. A 1090 MHz band-pass filter (BPF) 114 is used to provide rejection of out of band signals prior to a Low Noise Amplifier (LNA) 116. The 1090 MHz signal is amplified by the LNA 116 and is down-converted to an intermediate frequency (IF) by a mixer 118 and a local oscillator 120. The IF signal is amplified by amplifier 122 and filtered through an IF BPF 124 in order to remove any undesired image frequency components. The IF BPF 124 also sets the final receiver bandwidth which affects receiver sensitivity. IF BPF 124 may comprise both a wide-band and a narrow band IF filter, which filters may be switchable by software. The wide-band IF BPF may be used when TCAS 100 is processing ATCRBS replies, and the narrow-band IF BPF may be used when listening for Mode S Replies or ADS-B/TIS-B squitters. The use of a narrow-band IF BPF is described in DO-260A Appendix M.4.1. The filtered IF signal is input to a Logarithmic Amplifier 126, which generates the receiver video base-band signal. The Logarithmic Amplifier 126 removes the IF frequency component and provides a base-band video signal whose output is a logarithmic-to-linear conversion of the receiver waveform. This allows the receiver to decode signals over a wide dynamic range without the use of Automatic Gain Control (AGC). The video base-band signal is input to an Analog-to-Digital (A/D) converter 128, which outputs the quantized data samples to a device 130, which may include a Field Programmable Gate Array (FPGA), an Application Specific Integrated Circuit (ASIC), a Digital Signal Processor (DSP) or any combination of the foregoing or equivalents thereof to perform functionality, as set forth in more detail below with reference to FIGS. 2A and 2B. Thus, in one embodiment, device 130 may comprise a FPGA programmed to perform the functionality, as described further below with reference to FIGS. 2A and 2B.

The FPGA performs digital pulse sampling and detection algorithms, including those described in DO-185A and DO-260A, namely, TCAS pulse sampling and detection algorithms, as defined in DO-185A, and ADS-B/TIS-B pulse sampling and detection algorithms, as defined in DO-260A.

TCAS pulse sampling and detection algorithms, as defined in DO-185A, include the reception of ATCRBS Mode C replies to own-ship TCAS Whisper/Shout Interrogations, the reception of Mode S replies (DF-0 and DF-16) to own-ship TCAS Mode S Interrogations, and the reception of Mode S signals which are not replies to own-ship TCAS interrogations. These Mode S replies could include, but are not limited to DF0, DF4, DF5, DF11, DF17.

ADS-B/TIS-B pulse sampling and detection algorithms, as defined in DO-260A, include the reception of DF-17, DF-18 and DF-19 Mode S messages. These techniques are defined in DO-260A Appendix I. The FPGA also performs digital pulse sampling and detection algorithms set forth in U.S. application Ser. No. 11/784,235, entitled "Method and Apparatus to Increase ADS-B Squitter Reception Sensitivity."

The output of the FPGA contains the data value of the decoded message along with other information. For ADS-B and TIS-B replies, the value of the received 112 bit message along with other information is sent to a microprocessor 132. The microprocessor 132 processes TCAS and ADS-B/TIS-B receiver data and performs surveillance and collision avoidance functions. The ADS-B/TIS-B receiver data may be used for a number of applications, which are independent from the TCAS functionality or may be used by the TCAS functionality.

Varying Preamble Reference Level on Multiple Processing Paths

Figure 2A:
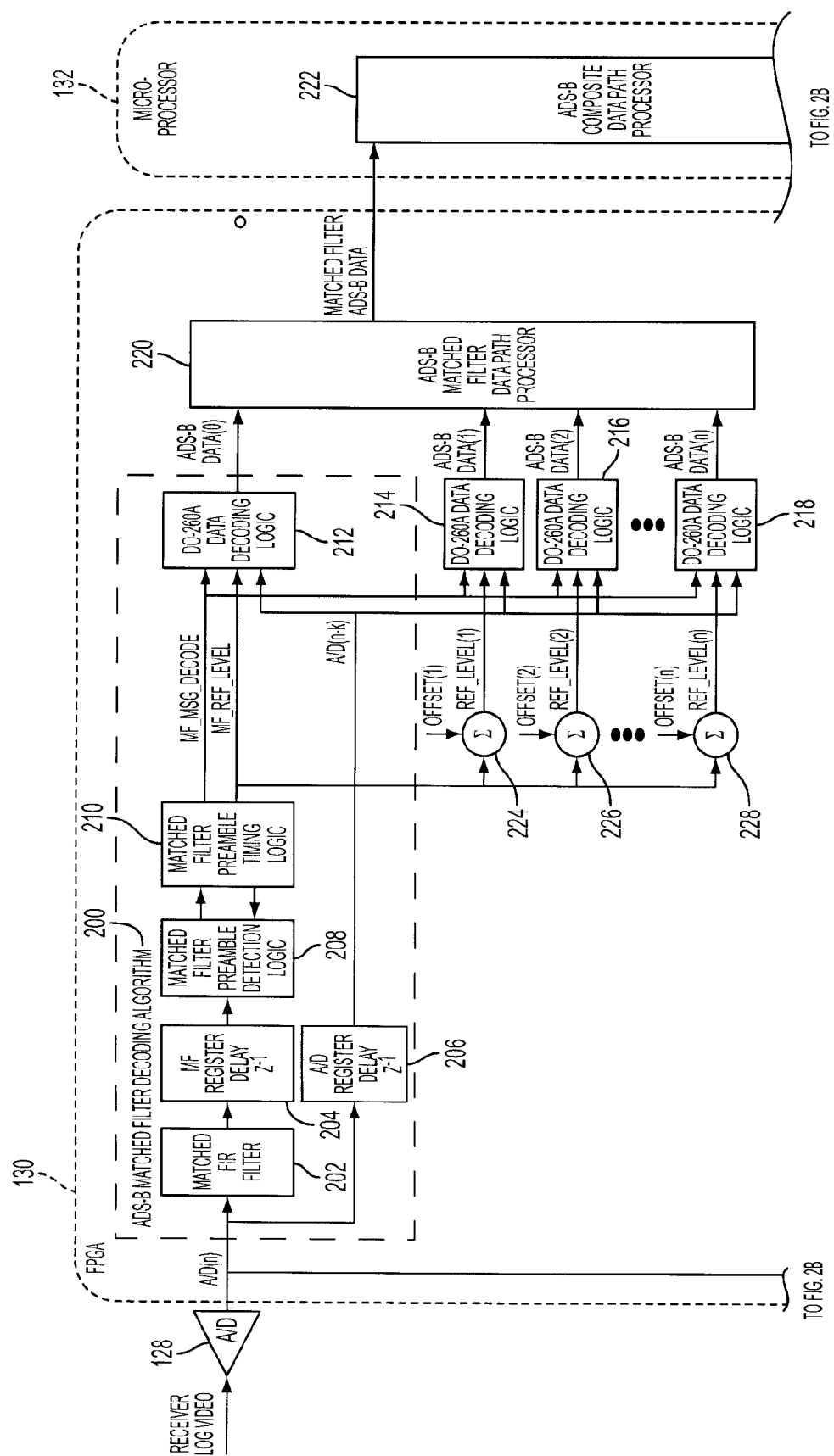
FIGS. 2A and 2B collectively show a block diagram of circuitry for decoding ADS-B and/or TIS-B messages and providing the same to a processor, in accordance with systems and methods consistent with the present invention.
Figure 2B:
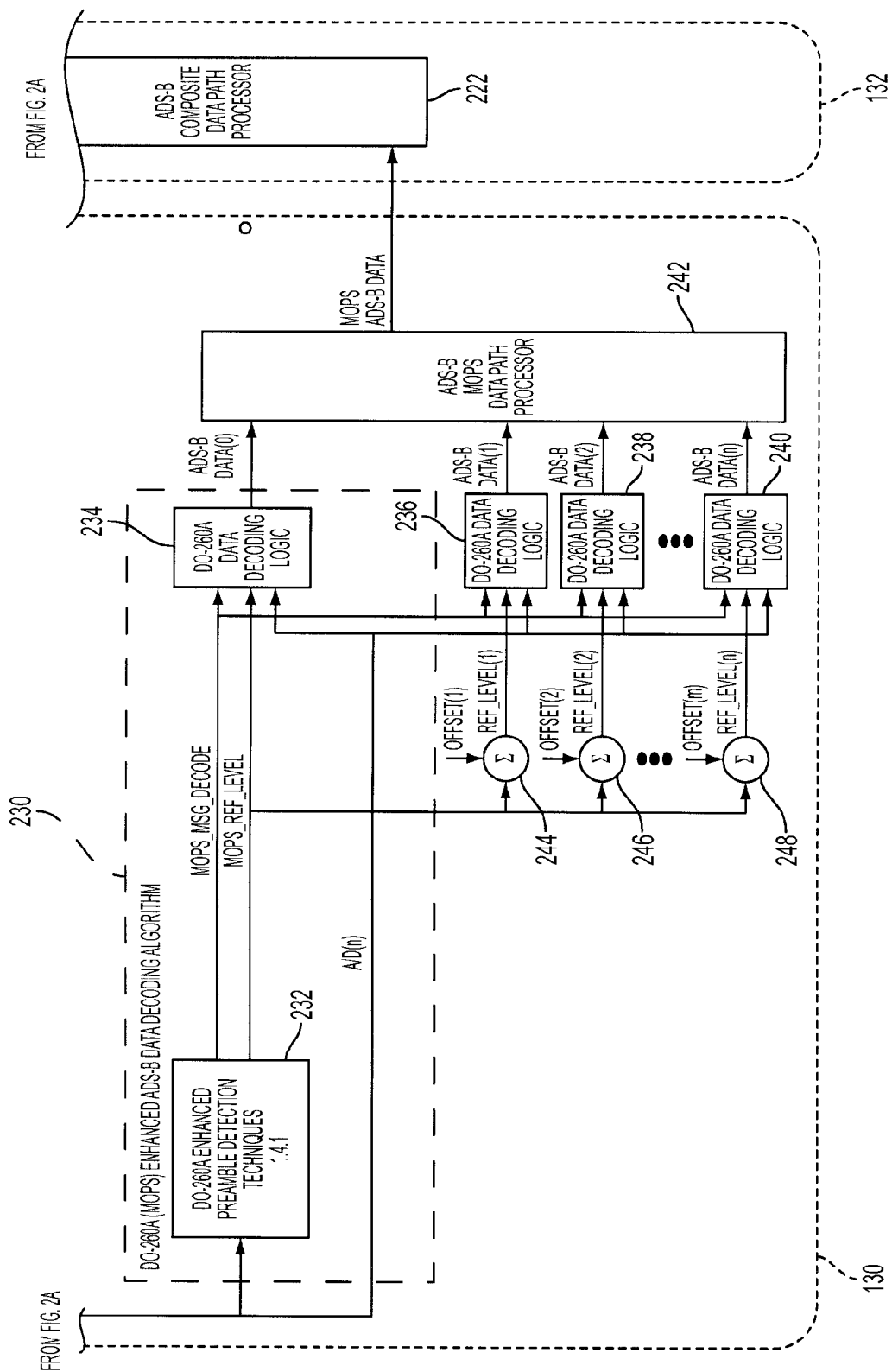

Referring to FIGS. 2A and 2B, a block diagram is shown of device 130 and microprocessor 132. In this exemplary embodiment, device 130 comprises a FPGA.

Referring to FIG. 2A, the output of A/D converter 128 is input to a matched finite impulse response (FIR) filter 202, which provides additional filtering of the receiver video to reduce noise and provides an input to a matched filter register delay $Z^{-1}$ 204. The matched filter register delay $Z^{-1}$ 204 provides a number of delayed samples of the matched filter output (e.g., approximately 13 micro-seconds, which is the time period required to include the 4 preamble pulses and the first 5 data pulses) and provides an input to a matched filter preamble detection logic 208. The matched filter preamble detection logic 208 determines the presence of a valid ADS-B preamble by applying various tests to the register delay $Z^{-1}$ 204 data outputs (the tests for determining the presence of a valid ADS-B preamble are described in U.S. application Ser. No. 11/784,235, entitled "Method and Apparatus to Increase ADS-B Squitter Reception Sensitivity.") The matched filter preamble detection logic 208 provides an input to and receives an input from a matched filter preamble timing logic 210. The matched filter preamble timing logic 210 determines the location of the start of the first data pulse in the ADS-B or TIS-B message, determines the reference level of the preamble (the determining of the reference level of the preamble is described in U.S. application Ser. No. 11/784,235, entitled "Method and Apparatus to Increase ADS-B Squitter Reception Sensitivity," though any other means may be employed to determine the preamble reference level) and outputs signals MF_MSG_DECODE and MF_REF_LEVEL, respectively standing for matched filter message decode and matched filter reference level.

The MF_MSG_DECODE signal is input to n+1 DO-260A data decoding logic blocks 212-218 (where n stands for the number of non-zero reference level offsets which are applied to the MF_REF_LEVEL signal). The MF_REF_LEVEL signal is input to DO-260A data decoding logic block 212, as well as to DO-260A data decoding logic blocks 214-218 through respective summers 224-228, which apply offsets to the MF_REF_LEVEL signal. The output of A/D converter 128 is also input to an A/D register delay $Z^{-1}$ 206, which delays the input A/D samples a sufficient amount of time so that when a preamble is detected, the first data bit which is processed will be data bit one of the ADS-B message. This is necessary since the preamble detection will not complete until after the fifth data bit in the ADS-B message, so it is desirable to delay the data. A/D register delay $Z^{-1}$ 206 provides an input to each of DO-260A data decoding logic blocks 212-218. DO-260A data decoding logic blocks 212-218 each serve to perform the (1) Enhanced Bit and Confidence Declaration using the Baseline Multi-Sample Technique, as defined in Section 4.2.3.1 of Appendix I and (2) Enhanced Error Detection and Correction Techniques using the Conservative and Brute Force Techniques, as defined in Sections 4.3.2 and 4.3.4 and FIG. I.9 of Appendix I. DO-260A data decoding logic blocks 212-218 provide respective data outputs ADS-B DATA(0) to ADS-B DATA(n) to an ADS-B matched filter data path processor 220, which selects a single path which has valid data (if more than one path has valid data). DO-260A data decoding logic blocks 212-218 may perform the validation using any well known method, e.g., as previously discussed herein. The ADS-B matched filter data path processor 220 outputs MATCHED FILTER ADS-B DATA to an ADS-B composite data path processor 222.

The matched finite impulse response (FIR) filter 202, the matched filter register delay $Z^{-1}$ 204, the matched filter preamble detection logic 208, the matched filter preamble timing logic 210, the A/D register delay $Z^{-1}$ 206 and the DO-260A data decoding logic block 212 are collectively referred to and provide an ADS-B matched filter decoding algorithm 200.

Referring to FIG. 2B, the output of A/D converter 128 is input to a DO-260A enhanced preamble detection logic 232, the logic for which is set forth in DO-260A Appendix I Section 4.1. The DO-260A enhanced preamble detection logic 232 outputs signals MOPS_MSG_DECODE and MOPS_REF_LEVEL, respectively standing for MOPS message decode (start of the first data bit in the ADS-B message) and MOPS reference level.

The MOPS_MSG_DECODE signal is input to n+1 DO-260A data decoding logic blocks 234-240 (where n stands for the number of non-zero reference level offsets which are applied to the MOPS_REF_LEVEL signal). The MOPS_REF_LEVEL signal is input to DO-260A data decoding logic block 234, as well as to DO-260A data decoding logic blocks 236-240 through respective summers 244-248, which apply offsets to the MOPS_REF_LEVEL signal. The output of A/D converter 128 is also input to each of DO-260A data decoding logic blocks 234-240. DO-260A data decoding logic blocks 234-240 each serve to perform the (1) Enhanced Bit and Confidence Declaration using the Baseline Multi-Sample Technique, as defined in Section 4.2.3.1 of Appendix I, and (2) Enhanced Error Detection and Correction Techniques using the Conservative and Brute Force Techniques, as defined in Sections.4.3.2 and 4.3.4 and FIG. I.9 of Appendix I. DO-260A data decoding logic blocks 234-240 provide respective data outputs ADS-B DATA(0) to ADS-B DATA(n) to an ADS-B MOPS data path processor 242, which selects a single path which has valid data (if more than one path has valid data). DO-260A data decoding logic blocks 234-240 may perform the validation using any well known method, e.g., as previously discussed herein. The ADS-B MOPS data path processor 242 outputs MOPS ADS-B DATA to the ADS-B composite data path processor 222.

The DO-260A enhanced preamble detection techniques logic 232 and the DO-260A data decoding logic 234 are collectively referred to and provide a DO-260A (MOPS) enhanced ADS-B data decoding algorithm 230.

As shown in FIGS. 2A and 2B, one of the embodiments of the present invention provide a TCAS 100 that uses multiple processing paths while varying the preamble reference level. In one processing path, the processes being performed by the DO-260A (MOPS) enhanced ADS-B data decoding algorithm 230, as shown in FIG. 2B, is set forth in Appendix I. More specifically, these processes comprise (1) Enhanced Preamble Detection, as defined in Section 4.1 of Appendix I, (2) Enhanced Bit and Confidence Declaration using the Baseline Multi-Sample Technique, as defined in Section 4.2.3.1 of Appendix I and (3) Enhanced Error Detection and Correction Techniques using the Conservative and Brute Force Techniques, as defined in Sections.4.3.2 and 4.3.4 and FIG. I.9 of Appendix I. In another processing path, the processes being performed by the ADS-B matched filter decoding algorithm 200, as shown in FIG. 2A, is described in U.S. application Ser. No. 11/784,235, which is entitled "Method and Apparatus to Increase ADS-B Squitter Reception Sensitivity."

In another embodiment of the present invention, the ADS-B matched filter decoding algorithm 200 and/or the DO-260A (MOPS) enhanced ADS-B data decoding algorithm 230 process ADS-B and/or TIS-B messages through multiple data decoding paths, while varying the preamble reference level for either path or both paths.

The ADS-B matched filter decoding algorithm 200 and DO-260A (MOPS) enhanced ADS-B data decoding algorithm 230 each produce a preamble reference level (MF_REF_LEVEL and MOPS_REF_LEVEL) which is input to a respective DO-260A data decoding logic 212 and 234. These DO-260A data decoding logic blocks 212 and 234 use the preamble reference level to determine the bit value and bit confidence for the 112 bit ADS-B and/or TIS-B message and perform error detection and error correction operations on the message. The preamble reference level is used to determine the bit value and bit confidence. The error detection and correction operations use the bit value and confidence, but do not directly use the preamble reference level. All of the DO-260A data decoding logic blocks 212-218 and 234-240 are identical.

Each of the DO-260A data decoding logic blocks 212-218 and 234-240 processes their respective input data according to the DO-260A Enhanced Bit and Confidence Declaration in section 4.2 of Appendix I. While this algorithm is well known, as documented in section 4.2 of Appendix I, other possible algorithms may also be used for the ADS-B and/or TIS-B data decoding function.

In one embodiment of the present invention, the "Baseline Multi-Sample Technique," as described in section 4.2.3.1 of Appendix I, may be used by DO-260A data decoding logic blocks 212-218 and 234-240. The threshold for determining the bit values and confidence levels is adjusted for a 16 MHz sample rate (Appendix I discusses thresholds for bit confidence and bit value assuming an 8 or 10 MHz sample rate, these were extrapolated for a 16 MHz sample rate. The A/D converter 128 samples at a 16 MHz sample rate). The preamble reference level is input to respective DO-260A data decoding logic blocks 212-218 and 234-240 from the appropriate source. The start of the decoding operation is triggered off of the clock sample where the MSG_DECODE signal is a logic 1. If the MSG_DECODE signal is set to logic 1 prior to the end of the message decoding operation, a preamble re-trigger has occurred and the processing will restart with the new timing and reference levels provided to the relevant DO-260A data decoding logic blocks 212-218 and 234-240.

After the 112 bit message is received and the bit value and bit confidence for the message is decoded, the DO-260A data decoding logic blocks 212-218 and 234-240 perform the Enhanced Error Detection and Correction Techniques described in section 4.3 of Appendix I. In one embodiment of the present invention, the DO-260A data decoding logic blocks 212-218 and 234-240 use the message processing flowchart of FIG. I-9 in Appendix I. This includes the use of the "Conservative Error Correction" technique and "Brute Force Error Correction" technique if the decoded message contains errors. If the ADS-B and/or TIS-B message either has no errors, or was able to be corrected by either the "Conservative Error Correction" technique or "Brute Force Error Correction" technique, the 112 bit message is sent to the ADS-B composite data path processor 222 for use in surveillance or otherwise. The ADS-B matched filter data path processor 220 simply observes which of its incoming messages are correct and passes one of the correct messages to the ADS-B composite data path processor 222. If a message is not able to be corrected, the ADS-B matched filter data path processor 220 discards the uncorrected message.

For the ADS-B matched filter decoding algorithm 200, n additional DO-260A data decoding logic blocks 214-218 (i.e., additional relative to DO-260A data decoding logic block 212) are employed. These DO-260A data decoding logic blocks 214-218 use the same MF_MSG_DECODE and A/D signals, which are common to the DO-260A data decoding logic block 212, however the MF_REF_LEVEL used by DO-260A data decoding logic blocks 214-218 is summed with an offset for each of the additional decoding blocks 214-218. In one embodiment of the present invention, a total of 10 offsets are used, which produces 11 possible decoding path outputs. The offset values were chosen which provided the best results given resource constraints in the FPGA and are (in dB) +0.3, −0.3, +0.6, −0.6, +0.9, −0.9, +1.2, −1.2, +1.5, +1.8 (in later implementations of the present invention, it was found that three offsets are sufficient, such as −1.2, +1.2, +2.4 dB). Most of the errors which were due to the incorrect choice of a reference level were able to be corrected by choosing a small increment (within 2 dB) from the computed preamble reference level (MF_REF_LEVEL).

The outputs of the DO-260A data decoding logic blocks 212-218 from the ADS-B matched filter decoding algorithm 200 are input to the ADS-B matched filter data path processor 220, which selects a single decoding path which contains valid data. The ADS-B and/or TIS-B messages contain a Parity/Identity field (PI) which allows message errors to be detected with a very low undetected error rate. By using the multiple processing paths, it is possible to determine which path or paths produce a valid or invalid message. There may be more than one path which contains valid and identical ADS-B and/or TIS-B data, however a single path is chosen which produced valid decoded data. The selection of the path is arbitrary provided the decoded data has no detected errors. The ADS-B and/or TIS-B data from the selected path is transferred over a PCI data bus to a memory in the ADS-B composite data path processor 222 for use in surveillance or otherwise.

Embodiments of the present invention may also be applied to the DO-260A (MOPS) enhanced ADS-B data decoding algorithm 230, or other possible algorithms, by, for example, adding additional DO-260A data decoding logic blocks 236-240 using offsets. FIG. 2B shows this aspect of the present invention, as applied to the DO-260A (MOPS) enhanced ADS-B data decoding algorithm 230. In another embodiment of the present invention, one may elect not to add additional offset levels to the DO-260A (MOPS) enhanced ADS-B data decoding algorithm 230, particularly when the performance of the ADS-B matched filter decoding algorithm 200 is sufficient.

Multiple Processing Paths Using Dissimilar Algorithms

In an embodiment of the present invention, the TCAS 100 uses multiple processing paths, each employing dissimilar algorithms for data detection of the ADS-B and/or TIS-B message. The FPGA of FIGS. 2A and 2B employs two dissimilar algorithms for processing ADS-B and/or TIS-B messages. As discussed, in one processing path, the processes being performed by the DO-260A (MOPS) enhanced ADS-B data decoding algorithm 230, as shown in FIG. 2B, is set forth in Appendix I. More specifically, these processes comprise (1) Enhanced Preamble Detection as defined in Section 4.1 of Appendix I, (2) Enhanced Bit and Confidence Declaration using the Baseline Multi-Sample Technique, as defined in Section 4.2.3.1 of Appendix I, and (3) Enhanced Error Detection and Correction Techniques using the Conservative and Brute Force Techniques, as defined in Sections.4.3.2 and 4.3.4 and FIG. I.9 of Appendix I. In another processing path, the processes being performed by the ADS-B matched filter decoding algorithm 200, as shown in FIG. 2A, is described in U.S. application Ser. No. 11/784,235, which is entitled "Method and Apparatus to Increase ADS-B Squitter Reception Sensitivity." Both algorithms provide performance advantages under different test conditions. The algorithms process the input A/D data simultaneously and independently.

In an embodiment of the present invention, the outputs of the ADS-B matched filter data path processor 220 and the ADS-B MOPS data path processor 242 provide decoded ADS-B and/or TIS-B data to the ADS-B composite data path processor 222 through the PCI data bus. The ADS-B composite data path processor 222 may be implemented in the microprocessor 132 as software, however, the ADS-B composite data path processor 222 could also be implemented fully or partially in the FPGA. The ADS-B composite data path processor 222 filters ADS-B and/or TIS-B data prior to use for surveillance, collision avoidance or other algorithms.

When a valid ADS-B and/or TIS-B message is received by more than one processing path, one of the copies of the message is discarded. In this case, the preferred path used is the data path which was produced by the DO-260A (MOPS) enhanced ADS-B data decoding algorithm 230.

When a valid ADS-B and/or TIS-B message is received from the ADS-B matched filter decoding algorithm 200 and the preamble reference level for this message is above a predetermined threshold value, the message from this path is discarded. The reference level used for this is typically −72 dBm. The higher level messages are discarded since the DO-260A enhanced ADS-B data decoding algorithm 230 provides sufficient performance at these RF levels and above.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system, comprising:
a TCAS receiver with at least A3 receiver sensitivity for receiving and decoding one or more of an ADS-B message and a TIS-B message, said at least A3 receiver sensitivity achieved without an active antenna; and
a passive antenna coupled to the TCAS receiver.

2. A system, comprising:
a TCAS receiver having one or more filters, one or more amplifiers and one or more A/D converters, the one or more A/D converters for digitizing analog data into digital data for decoding one or more of an ADS-B message and a TIS-B message; and
circuitry for receiving the digital data and decoding the one or more of an ADS-B message and a TIS-B message, wherein the circuitry includes two or more paths for the decoding.

3. The system of claim 2 wherein the circuitry comprises one or more of an ASIC, an FPGA and a DSP.

4. The system of claim 2 further comprising a processor for receiving the decoded messages from the circuitry.

5. The system of claim 2 further including, before the circuitry for receiving the digital data, circuitry for determining a preamble reference level for one or more of an ADS-B message and a TIS-B message.

6. The system of claim 5 wherein one or more of the two decoding paths employs a plurality of offsets to adjust the determined preamble reference level.

7. The system of claim 2 wherein the two or more paths perform different processes on the digital data for decoding.

8. A method, comprising:
providing a TCAS receiver having one or more filters, one or more amplifiers and one or more A/D converters, the one or more A/D converters for digitizing analog data into digital data for decoding one or more of an ADS-B message and a TIS-B message; and
receiving the digital data and decoding the one or more of an ADS-B message and a TIS-B message with circuitry including two or more paths for the decoding.

9. The method of claim 8 wherein the circuitry comprises one or more of an ASIC, an FPGA and a DSP.

10. The method of claim 8 further comprising receiving the decoded messages from the circuitry.

11. The method of claim 8 further including determining a preamble reference level for one or more of an ADS-B message and a TIS-B message.

12. The method of claim 11 wherein one or more of the two decoding paths employs a plurality of offsets to adjust the determined preamble reference level.

13. The method of claim 8 wherein the two or more paths perform different processes on the digital data for decoding.

* * * * *